United States Patent [19]
Shook

[11] Patent Number: 6,155,394
[45] Date of Patent: Dec. 5, 2000

[54] BICYCLE COASTING MECHANISM

[76] Inventor: William B. Shook, 3917 Eden Roc Cir. East, Tampa, Fla. 33634

[21] Appl. No.: 09/274,445

[22] Filed: Mar. 22, 1999

[51] Int. Cl.[7] .................................................. F16D 41/30
[52] U.S. Cl. ............................................. 192/46; 74/576
[58] Field of Search ........................... 192/46, 64; 74/576

[56] References Cited

U.S. PATENT DOCUMENTS

| | | | |
|---|---|---|---|
| 398,228 | 2/1889 | Cartensen | 192/46 |
| 404,490 | 6/1889 | King | 192/46 |
| 756,086 | 3/1904 | Weiler | 192/46 |
| 1,429,196 | 9/1922 | Dughera | 192/64 |
| 3,557,922 | 1/1971 | Schwerdhoefer | 192/64 |
| 5,004,083 | 4/1991 | Lohman . | |
| 5,078,664 | 1/1992 | Nagano . | |
| 5,083,991 | 1/1992 | Yang . | |
| 5,322,487 | 6/1994 | Nagano . | |
| 5,660,083 | 8/1997 | Huang et al. . | |

FOREIGN PATENT DOCUMENTS

| | | | |
|---|---|---|---|
| 104447 | 3/1917 | United Kingdom | 192/46 |

*Primary Examiner*—Richard M. Lorence
*Attorney, Agent, or Firm*—Francis T. Kremblas, Jr

[57] ABSTRACT

The present invention is directed to a bicycle coasting mechanism. The coasting mechanism includes a plurality of pawls which are rotatably mounted and which are configured to engage a plurality of ratchet teeth. A linkage engages each pawl and causes the substantially simultaneous engagement of each pawl with the ratchet teeth.

32 Claims, 10 Drawing Sheets

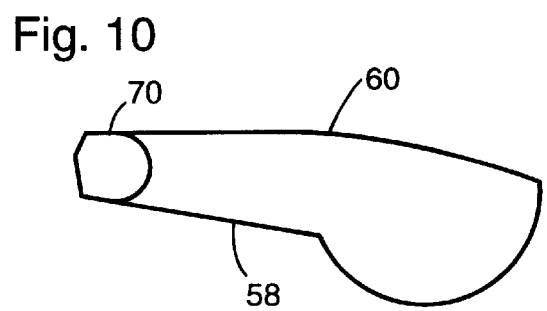
Fig. 9
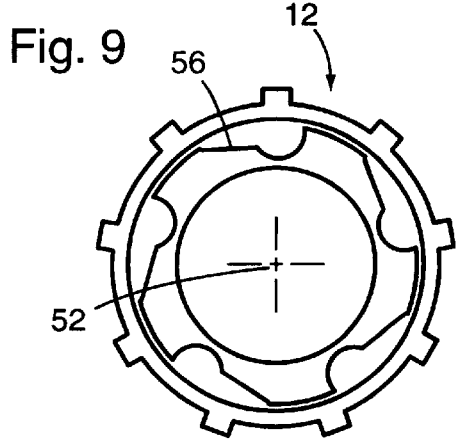
Fig. 10
Fig. 11
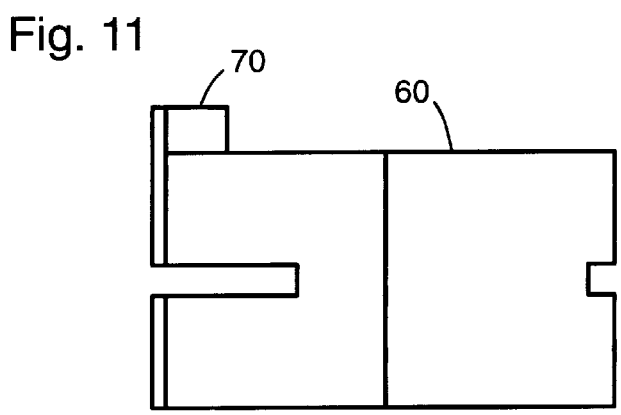
Fig. 12
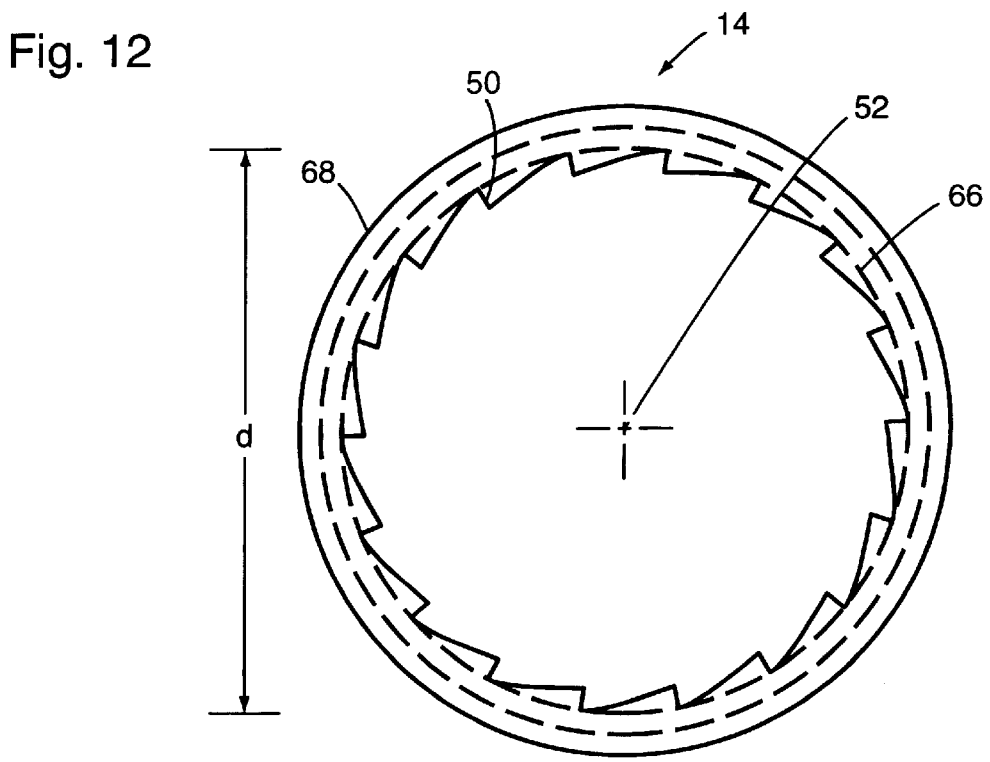

BICYCLE COASTING MECHANISM

BACKGROUND OF THE INVENTION

1. Field of the Invention

The present invention relates generally to a coasting mechanism for use in a bicycle, and more particularly to a coasting mechanism which includes a plurality of pawls which substantially simultaneously engage ratchet teeth to transmit a drive force from pedals to a wheel.

2. Description of the Related Art

A bicycle uses a coasting mechanism to alternately link and detach the driving force of the pedals and the rear wheel of the bicycle. Many years ago, the pedals and rear wheel were directly linked, so that the pedals rotated whenever the wheel turned. However, it was found to be desirable to include a mechanism which permits the bicycle to "coast," i.e., to have the wheel turn without turning the pedals. This coasting action has traditionally been accomplished through the use of two pawls which are individually sprung and which permits the pawls to engage ratchet teeth when a driving force is applied, rotating the pawls in one direction with respect to the ratchet teeth, but permit the pawls to pass the ratchet teeth when no driving force is applied and the pawls rotate in the other direction with respect to the ratchet teeth, thereby permitting the wheel to continue rotating without rotating the pedals. Since that time, few changes have been made to this pawl system.

Various other elements have also been connected to a bicycle in similar ways. Some examples of other attachment mechanisms which use a pawl system are found in the patents to Lohman, U.S. Pat. No. 5,004,083; Yang, U.S. Pat. No. 5,083,991; the two patents to Nagano, U.S. Pat. Nos. 5,078,664 and 5,322,487; and Huang et al., U.S. Pat. No. 5,660,083. However, in these patents and the prior art devices, the pawls are individually sprung. This creates a problem, since there are irregularities in the alignment of the pawls and ratchet teeth due to manufacturing limitations, uneven expansion of materials through heat, and a misalignment of parts due to the use of ball bearings in the wheel area, among other things. These irregularities can combine to result in only one pawl engaging the ratchet teeth at a particular time. If only one pawl engages, it will often break, because the load from the driving force is intended to be distributed between two pawls, and thus neither pawl is made strong enough to bear the entire force alone. If one of the pawls breaks, then the other pawl will likewise break once it engages the ratchet teeth, since it alone cannot bear the load.

This problem is accentuated in the area of mountain bike racing. In mountain bike racing, there is a higher force and torque which is applied through the pedals as a driving force than ordinarily encountered in road use. In addition, mountain bike racing is often done on dirt tracks, which increases the probability of dirt or other foreign objects entering the coasting mechanism and interfering with the proper operation of the pawls. In addition, modification of the system to use a single pawl which can withstand the load alone is not appropriate, since this would require too much additional size and weight in the pawl and in the coasting mechanism as a whole, which is not desirable, since increases in size and weight tend to slow a bicycle, rather than provide an edge in racing.

What is needed, therefore, is a coasting mechanism which uses multiple pawls and which includes a linkage which causes the substantially simultaneous engagement of the pawls with the ratchet teeth, to prevent the engagement of one pawl alone. In addition, it is desirable that this coasting mechanism be reduced in size or weight from the standard configuration. It is also desirable that the coasting mechanism be designed to take into account the irregularities which can occur. The present invention includes these and other important features.

SUMMARY OF THE INVENTION

The present invention relates to a bicycle coasting mechanism. This mechanism permits the engagement of a drive body, which engages a bicycle gear, with a hub body, which engages a bicycle wheel. This mechanism permits the driving force to be imparted to the wheel when a driving force is applied, while permitting the bicycle to coast when no driving force is applied.

A plurality of pawls is interfittingly and rotatably mounted in a plurality of depressions in one of the bodies. A plurality of ratchet teeth is arranged generally circularly on the other of the bodies, preferably in the form of an integral ring. The ratchet teeth are configured to engage the pawls. The pawls are arranged generally circularly about an axis. A linkage engages each pawl. Moving the linkage rotates each pawl and thereby substantially simultaneously engages the pawls and ratchet teeth.

In a first embodiment, the linkage is a cam plate. This linkage engages the pawls through a plurality of cam slots and a plurality of cam followers, each cam follower slidingly interfitting with one of the cam slots. In a preferred embodiment, the cam slots are made in the cam plate and the cam followers are fingers on the pawls, one finger of one pawl slidingly interfitting with one of the cam slots in the cam plate.

In a first alternative configuration for this embodiment, the depressions are generally cylindrical cavities in one of the bodies and each pawl includes a pin which interfits with one of the generally cylindrical cavities. In a second alternative configuration for this embodiment, the depressions are formed to generally conform to the shape of one side of one of the pawls, and one of these depressions may be larger than the remaining depressions, thereby permitting the pawl mounted in the larger depression to slide rotationally in the depression with respect to the axis.

In a second embodiment, the linkage is a gear. The gear is preferably located concentrically outwardly from the pawls. Each of the pawls includes a gear sector configured to interfit with the teeth on the gear. The depressions are formed to generally conform to the shape of one side of a pawl, and one of these depressions is larger than the remaining depressions, thereby permitting the respective pawl mounted in the larger depression to slide rotationally in the depression. This embodiment may further include a spring biasing the pawl mounted in the larger depression rotationally clockwise in the depression.

In a third embodiment, the linkage includes a plurality of brackets and a plurality of bands. Each bracket is attached to one of the pawls and each band is secured to adjacent brackets. The rotation of one pawl moves the bracket to which it is attached. This movement causes the other brackets attached to the other pawls, thereby rotating the plurality of pawls substantially simultaneously. The brackets are located concentrically inwardly of the pawls.

BRIEF DESCRIPTION OF THE DRAWINGS

FIG. 9 is a front view of a plurality of recesses configured to receive a plurality of pawls according to a second alternative configuration of a first embodiment of the present invention;

FIG. 10 is a front view of a pawl according to a second alternative configuration of a first embodiment of the present invention;

FIG. 11 is a bottom view of a pawl according to a second alternative configuration of a first embodiment of the present invention;

FIG. 12 is a front view of a plurality of ratchet teeth according to a second alternative configuration of a first embodiment of the present invention;

Figure 1:
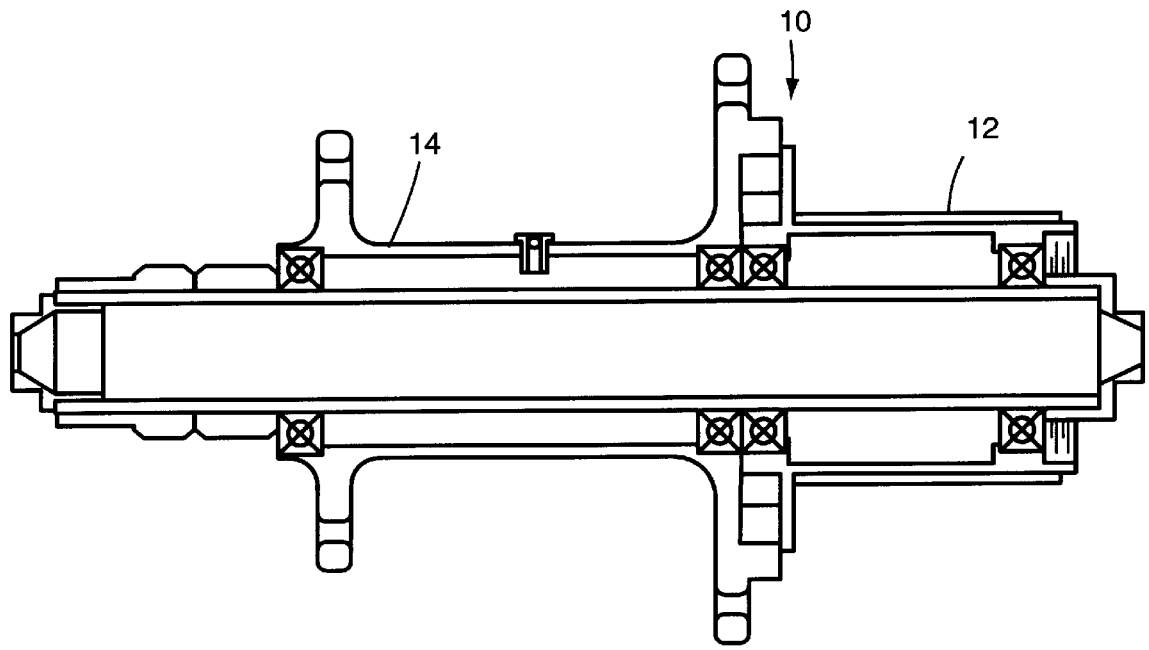
FIG. 1 is a sectional view of the general arrangement of the bicycle coasting mechanism according to the present invention.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the word connected or terms similar thereto are often used. They are not limited to direct connection but include connection through other elements where such connection is recognized as being equivalent by those skilled in the art. Those skilled in the art will also recognize that there are many, and in the future may be additional, alternative elements which are recognized as equivalent because they provide the same operations.

DETAILED DESCRIPTION OF THE INVENTION

Turning first to FIG. 1, the general configuration of the structure of a bicycle which surrounds the bicycle coasting mechanism 10 is shown. As is conventional in coasting mechanisms, the bicycle coasting mechanism 10 permits the engagement of a drive body 12 with a hub body 14. The drive body 12 engages at least one bicycle sprocket (not shown). The hub body 14 engages a bicycle wheel (not shown). In use, the bicycle sprocket is drivingly linked to the pedals of the bicycle (not shown), usually by way of a chain (not shown). A user imparts a driving force to the wheel by pedaling the bicycle, and the force is transmitted through the drive body 12, coasting mechanism 10, and hub body 14 to the wheel. When a user is not pedaling the bicycle, the coasting mechanism 10 allows the drive body 12 and hub body 14 to become disengaged in order to allow the wheel and hub body 14 to continue to turn without the drive body 12, gears, sprockets, and pedals also turning. This operation is conventional in the art, and the presently disclosed configurations are used to accomplish this result. The remaining Figures and description are directed primarily to the structure of the coasting mechanism 10, wherein lies the invention.

Figure 2:
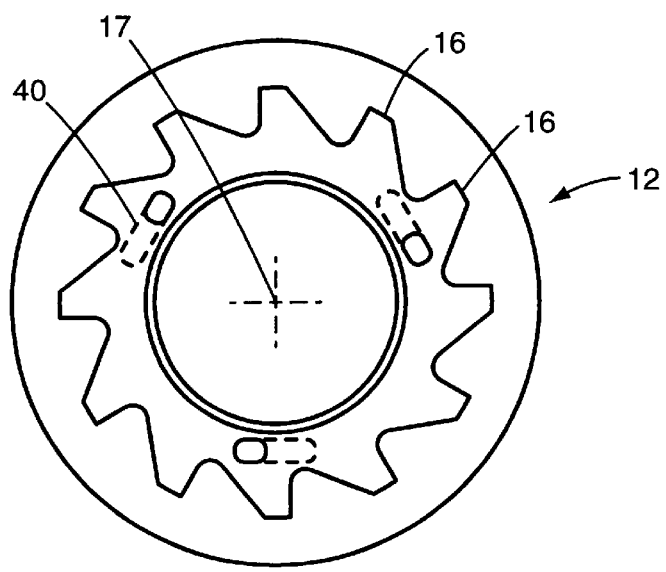
FIG. 2 is a front view of a plurality of ratchet teeth arranged according to a first alternative configuration of a first embodiment of the present invention.

FIGS. 2–7 illustrate a first alternative configuration of a first embodiment of the coasting mechanism 10 where the linkage is a cam plate. FIG. 2 shows a plurality of ratchet teeth 16 which are arranged generally circularly about an axis 17 on the drive body 12. In a preferred embodiment, the ratchet teeth 16 are integrally formed in a ring, as shown.

Figure 3:
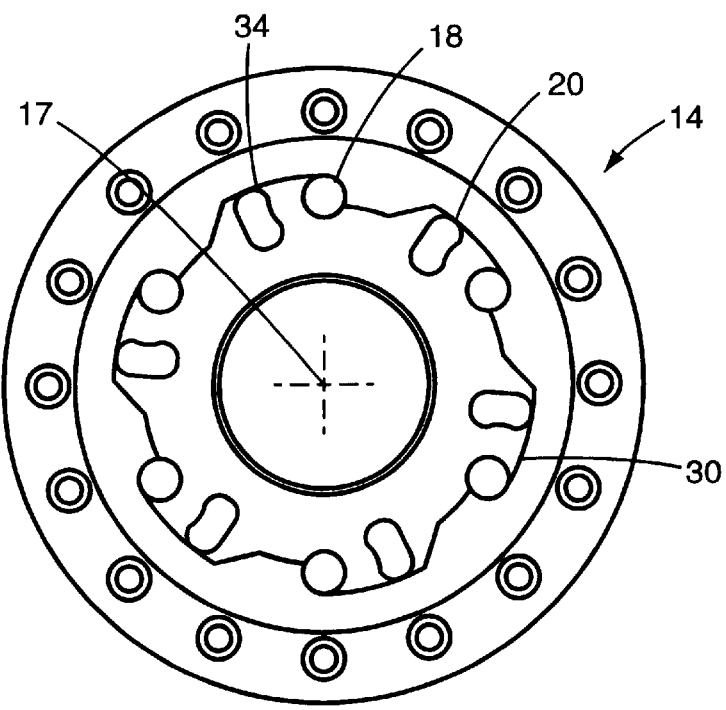
FIG. 3 is a front view of a plurality of recesses configured to receive a plurality of pawls according to a first alternative configuration of a first embodiment of the present invention.
Figure 5:
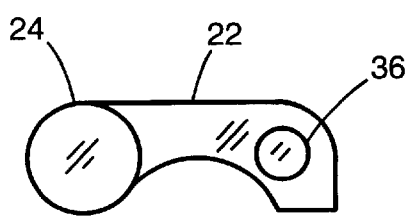
FIG. 5 is a front view of a pawl according to a first alternative configuration of a first embodiment of the present invention.
Figure 6:
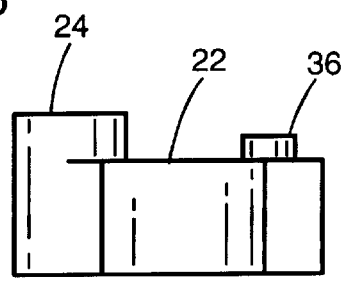
FIG. 6 is a bottom view of a pawl according to a first alternative configuration of a first embodiment of the present invention.

FIG. 3 illustrates a front view of the hub body 14 which includes a plurality of cylindrical cavities 18 and a plurality of generally oval grooves 20. Each pawl 22, as illustrated in FIGS. 5 and 6, includes a pin 24 which interfits with one of the cylindrical cavities 18. The placement of the pin 24 into one of the cylindrical cavities 18 causes the pawl 22 to be rotatably mounted in the cavity. Since the cylindrical cavities 18 are arranged generally circularly about the axis 17, the pawls 22 also are arranged generally circularly about the axis 17 once the pawls 22 have been placed in the cavities 18.

Figure 4:
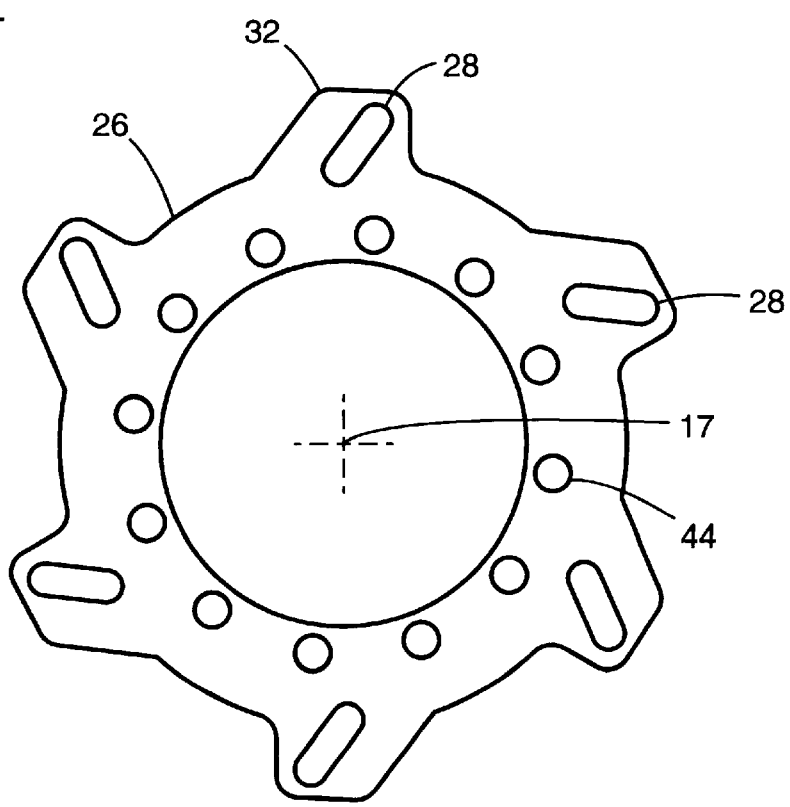
FIG. 4 is a front view of a cam plate according to a first alternative configuration of a first embodiment of the present invention.

FIG. 4 illustrates the cam plate 26 which is used as a linkage between the pawls 22. The cam plate 26 includes a plurality of cam slots 28. The cam plate 26 is placed in a central recess 30 in the hub body 14 and has a plurality of extensions 32 which fit into the outdents 34 of the central recess 30, but which are not as wide as the outdents 34, so that the cam plate 26 is rotatable about the axis 17 when it is placed in the central recess 30. As is seen most clearly in FIGS. 5 and 6, each pawl 24 includes a finger 36 which acts as a cam follower and slidingly interfits with one of the cam slots 28. The cam follower 36 passes through the cam slot 28 and into one of the oval grooves 20.

Figure 7:
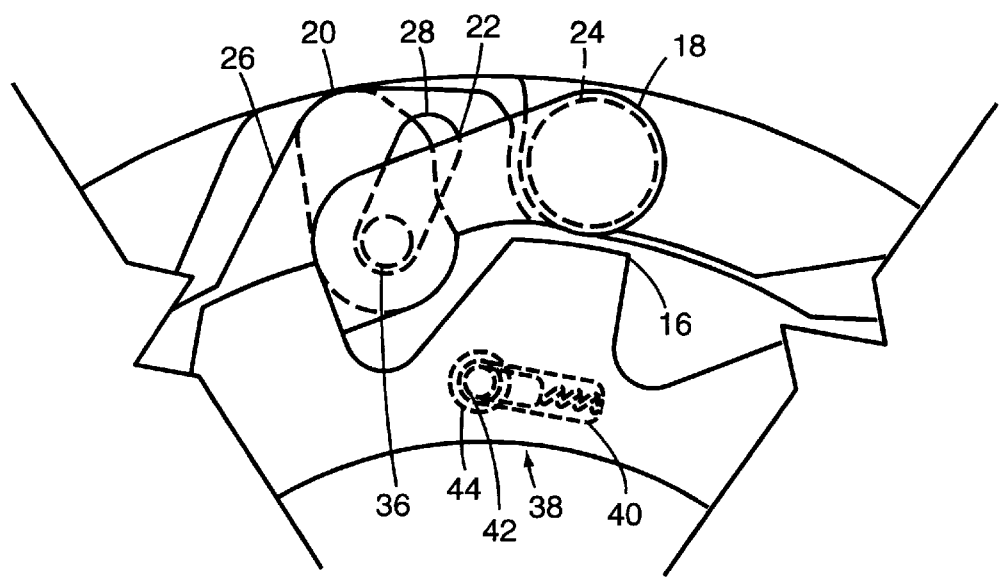
FIG. 7 is a schematic view showing the interaction of the ratchet teeth, pawls, and cam plate according to a first alternative configuration of a first embodiment of the present invention.

The interaction of these elements in use is shown in greater detail in FIG. 7. As shown, the pin 24 of the pawl 22 is rotatably seated within the cylindrical cavity 18. The finger 36 slidingly interfits with the cam slot 28, and passes through the cam slot 28 into the oval cavity 20. When the cam plate 26 is in the position shown in FIG. 7, the pawl 22 engages the ratchet teeth 16. When the cam plate 26 is rotated counter-clockwise, or to the left, the finger 36 will act as a cam follower and slide outward in the cam slot 28 and the oval recess 20. This rotation of the cam plate 26 disengages the pawl 22 from the ratchet teeth 16. When the pawl 22 engages the ratchet teeth 16, the driving force from the pedals is transmitted through this engagement to the wheel. When the pawl 22 is disengaged, the pedals are not being turned, but the wheel continues to turn and the bicycle is coasting.

The rotation of the cam plate 26 is caused by a secondary pawl system 38. The secondary pawl system includes a plurality of recesses 40 which are made at an angle with the surface of the ratchet teeth 16, as also shown in FIG. 2, into which are placed a plurality of pin pawls 42, each of which includes a spring which biases that pin pawl 42 generally out of the particular angled recess into which it is placed. When the bicycle is coasting, the pawls 42 and cam plate 26 rotate clockwise with respect to the pin pawls 42. Each pin pawl 42 extends out of the angled recess 40 and sequentially passes in and out of the cam holes 44 which are circularly arranged in the cam plate 26, also shown in FIG. 4. When the pedals are turned, the drive body 12, and consequently the ratchet teeth 16 and pin pawls 42 rotate clockwise. Each pin pawl 42 passes and remains through one of the cam holes 44 in the cam plate 26, thereby rotating the cam plate 26 clockwise and into the position shown in FIG. 7. While only one pawl 22 is shown in FIG. 7, the other pawls 22 operate in a similar manner. The rotation of the cam plate 26 clockwise will cause all the pawls 22 to engage the ratchet teeth 16 substantially simultaneously because all the pawls 22 will move together through their engagement with the linkage. When pedaling ceases, the pin pawls 42 remain through the cam holes 44 in the cam plate 26 until the cam plate 26 is rotated to a counter-clockwise position, which disengages the pawls 22 from the ratchet teeth 16 substantially simultaneously.

A variety of modifications can be made to this first alternative configuration of the first embodiment. First, the pawls 22 may be placed on the drive body 12 and ratchet teeth 16 may be positioned on the hub body 14. Second, the pawls 22 may be positioned concentrically inward of the ratchet teeth 16 instead of outward as shown. The ratchet teeth 16, instead of being integrally formed in a ring, can be individually mounted on one of the bodies 12, 14. In addition, the engagement of the cam slot 28 and cam follower 36 may be modified. The cam follower may be a finger attached to or integrally formed with the cam plate 26, in which case the pawl 22 would include a cam slot. In addition, a different type of secondary pawl system, such as a spring-loaded tab, or other, similar systems known in the art may be substituted for the pin pawls 42 shown. Finally, the preferred embodiment shows the use of six pawls 22. The use of six pawls 22 is preferred, but is not essential. Because more than the standard two pawls are used, the pawls 22 may be made smaller and may also be made of lighter material, such as aluminum, rather than the steel currently used for making pawls, because the load from the pedals is distributed among more pawls 22, and thus each pawl 22 need not be as strong as the pawls currently used. The precise number, configuration, shape, and material used for the pawls can be modified by one of ordinary skill in the art for a particular desirable strength. All these modifications fall within the scope of the invention.

FIGS. 8–14 show a second alternative configuration of the first embodiment of the coasting mechanism 10, where the linkage is a cam plate. FIG. 12 shows a plurality of ratchet teeth 50 which are arranged generally circularly about an axis 52 on the hub body 14. The ratchet teeth 50 preferably take the form of a ring, as shown. FIG. 9 is a front view of the drive body 12 which includes a plurality of depressions 56 which are formed to generally conform to the shape of one side 58 of one of the pawls 60, as best seen in FIG. 10. The plurality of depressions 56 are arranged generally circularly about the axis 52. The placement of the pawls 60 into the depressions 56 causes the pawls 60 to be rotatably mounted in the depressions 56 and therefore arranged generally circularly about the axis 52.

Figure 8:
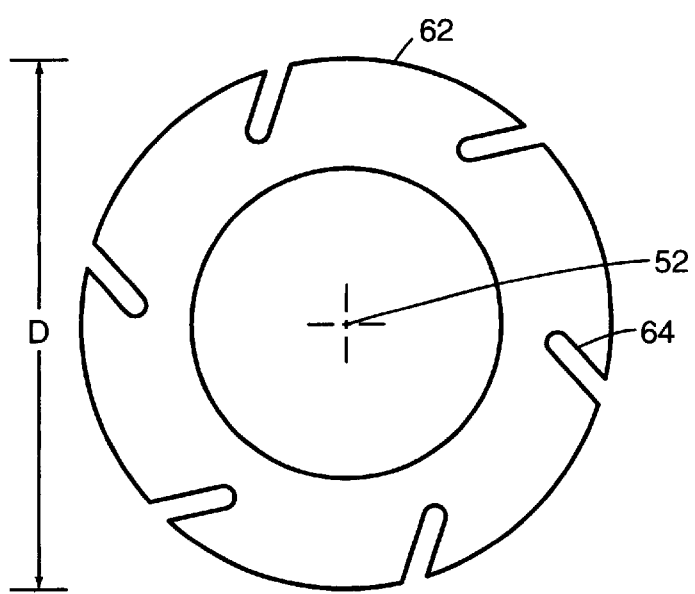
FIG. 8 is a front view of a cam plate according to a second alternative configuration of a first embodiment of the present invention.

FIG. 8 illustrates the cam plate 62 which is used as a linkage between the pawls 60. The cam plate 62 includes a plurality of cam slots 64. The cam plate 62 is placed in a central recess 66 in the ratchet tooth ring 68. The cam plate diameter D is approximately the same as the central recess diameter d, and the cam plate 62 is free to rotate about the axis 52 when it is placed in the central recess 66. As is seen most clearly in FIGS. 10 and 11, each pawl 60 includes a finger 70 which acts as a cam follower and slidingly interfits with one of the cam slots 64.

Figure 13:
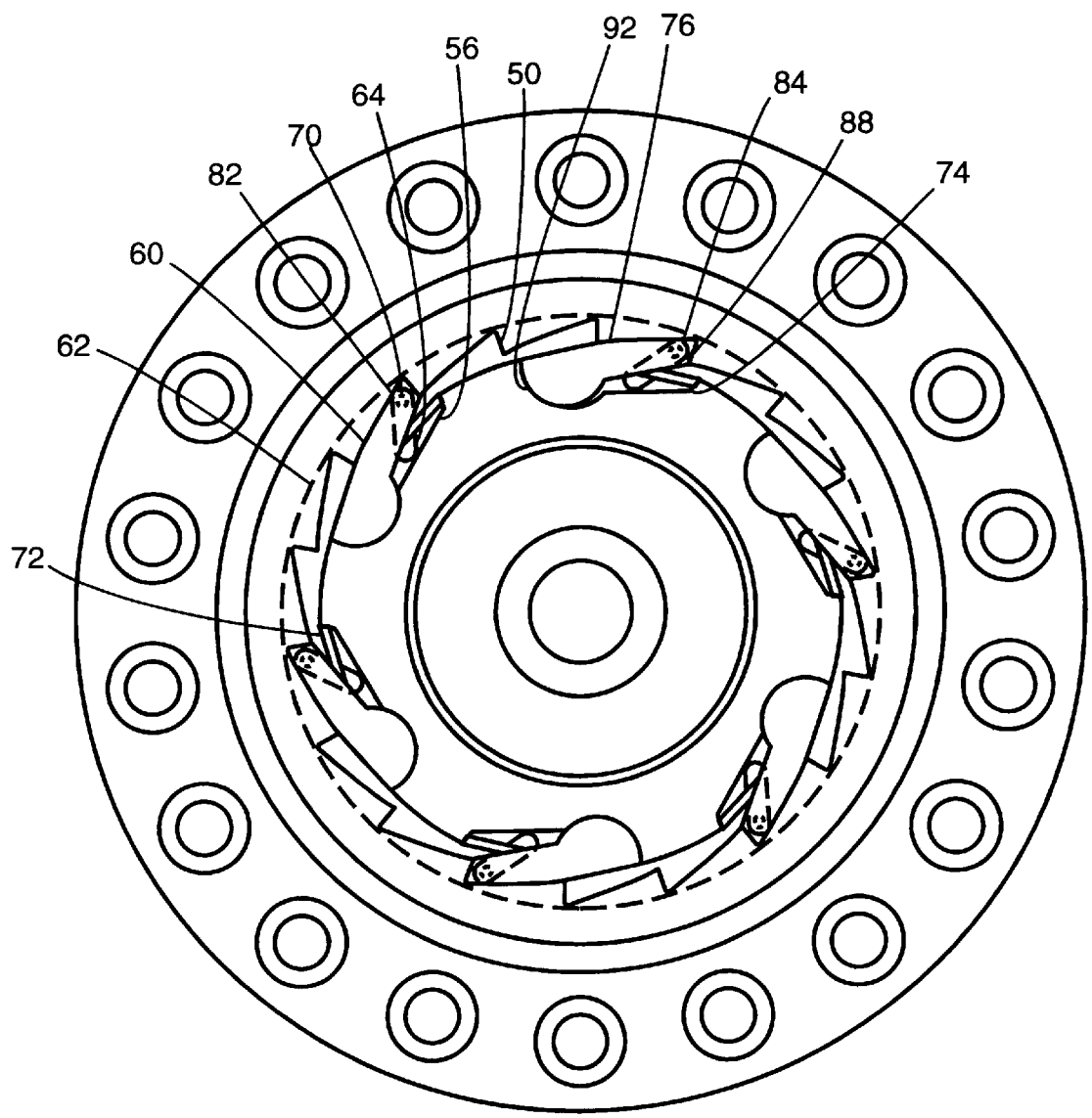
FIG. 13 is a schematic view showing the interaction of the ratchet teeth, pawls, and cam plate according to a second alternative configuration of a first embodiment of the present invention.
Figure 14:
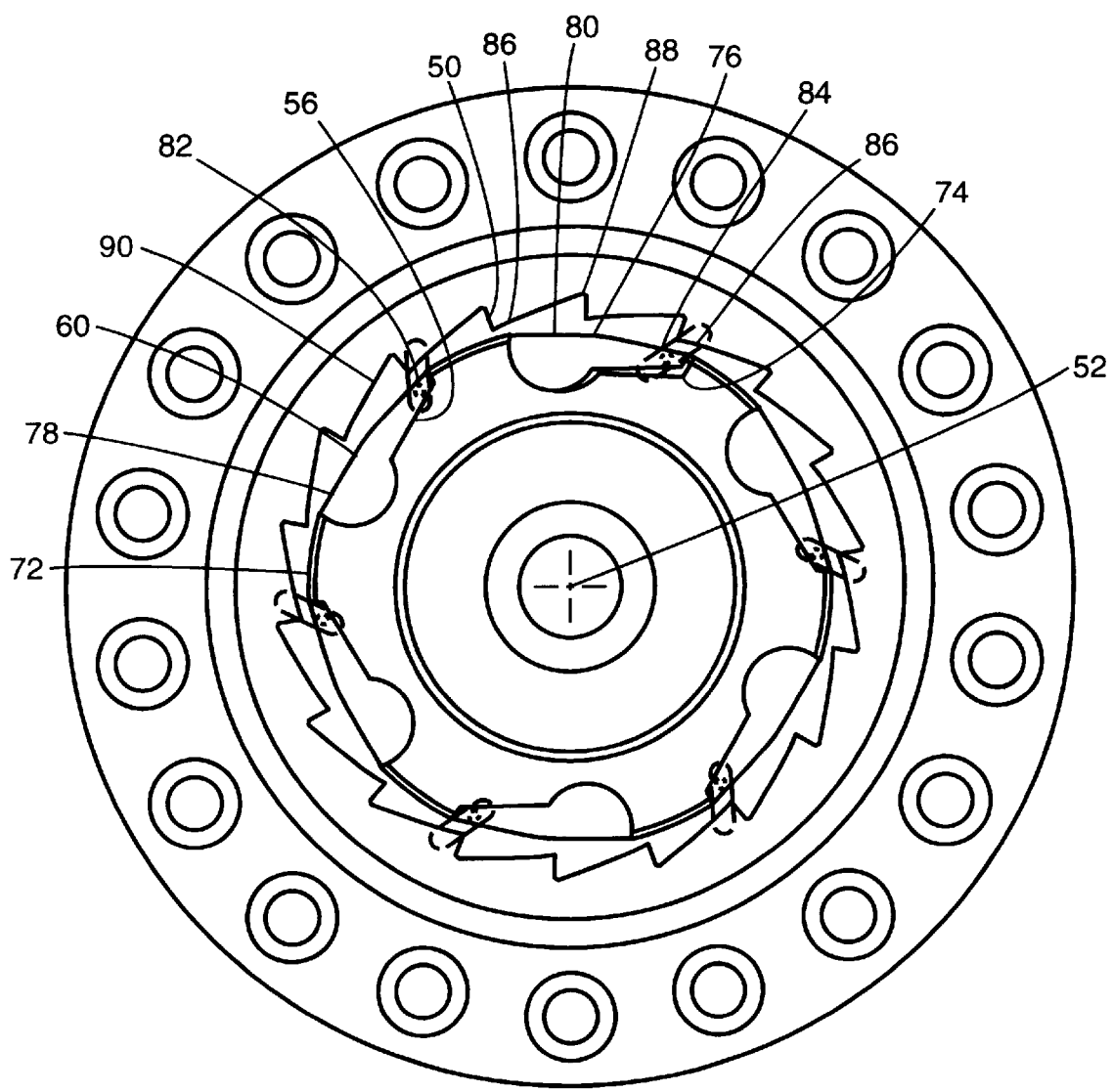
FIG. 14 is a second schematic view showing the interaction of the ratchet teeth, pawls, and cam plate according to a second alternative configuration of a first embodiment of the present invention.

The interaction of these elements in use is shown in greater detail in FIGS. 13 and 14. As shown in FIG. 13, the pawls 60 are placed in the depressions 56. The finger 70 slidingly interfits with the cam slot 64. When in the position shown in this Figure, the pawl 60 engages the ratchet teeth 50. When the cam plate 62 is rotated clockwise, or to the right, the finger 70 acts as a cam follower and slides inwardly in the cam slot 64. This rotation of the cam plate 62 disengages the pawls 60 from the ratchet teeth 50.

The pawls 60 are biased to rotate generally counter-clockwise in the depressions 56 by the use of a conventional wrap spring 72 in a conventional way. However, the use of the cam plate 62 requires all the pawls 60 to engage the ratchet teeth 50 substantially simultaneously and also to disengage substantially simultaneously. The use of the cam plate 62 prevents the engagement of only one pawl 60 even though each pawl 60 is individually sprung on the wrap spring 72, as is conventional, since the cam plate 62 will only rotate when all the pawls 60 are free to move. If one or more of the pawls 60 is prevented from engaging by not having cleared a particular ratchet tooth 50, none of the pawls will engage, since their movement is dictated by the cam plate 62.

In this embodiment, a modification may be made which further ensures the engagement of all the pawls 60 substantially simultaneously. Various irregularities in the coasting mechanism can occur through manufacturing and using of bicycles. These include: variation in the size of the ratchet teeth, pawls, and other components due to tolerances, failure for the hub to run on true center due to bearing limitations, and unequal heat expansion of the materials used. To compensate for these irregularities, a master depression 74 is used. The master depression 74 is larger than the remaining depressions 56. A master pawl 76 is placed in the master depression 74. The use of the master depression 74 and the master pawl 76 is seen more clearly in FIG. 14.

As shown in FIG. 14, the wrap spring 72 applies a bias to a first end 78, 80 of each pawl 60, 76. This bias pushes the first end 78, 80 inward and clockwise in the depressions 56, 74 with respect to the axis 52 and, as shown in FIG. 13, rotating the pawls 60, 76 counter-clockwise with respect to the depressions 56, 74 to cause the free ends 82, 84 of the pawls 60, 76 to move outwardly and engage the ratchet teeth 50. However, as mentioned above, the free ends 82, 84 will not move until all the free ends 82, 84 have cleared the ratchet teeth 50.

Looking particularly at the master pawl 76, the master pawl 76, due to the bias of the spring 72, is positioned rotationally clockwise in the master depression 74 with respect to the axis 52. Because the master pawl 76 is substantially the same size and shape as the other pawls 60, but the master depression 74 is larger than the remaining depressions 56, the free end 84 of the master pawl 76 is the last of the free ends 82, 84 to clear a ratchet tooth 50 when coasting, i.e., when the ratchet teeth 50 are moving clockwise with respect to the pawls 60, 76, because it is further clockwise with respect to the ratchet teeth 50 than any of the remaining pawls 60. FIG. 14 shows the positioning of each of the free ends 82, 84 at a point in time when all the free ends 82, except the master pawl free end 84, have rotationally cleared the tips 86 of the ratchet teeth 50. Because the master pawl free end 84 has not cleared, the free ends 82 of the remaining pawls 60 cannot rotate outwardly, due to the constraint of the cam plate 62. Once the master pawl free end 84 clears the tip 86 of the ratchet tooth 50, the spring 72 pushes the master pawl free end 84 outwardly, rotating the cam plate 62 counter-clockwise and forcing the free ends 82 of the remaining pawls 60 outwardly. Since the master pawl 76 remains rotationally clockwise in the master depression 74, the master pawl free end 84 contacts the next ratchet tooth 50 near the root 88 of the ratchet tooth 50. The remaining pawl free ends 82 will contact the respective ratchet teeth 50 further along the ratchet tooth 50, or approximately at 90. The importance of these locations is in the positioning of the pawls 60, 76 when load is applied.

Returning to FIG. 13, when load is applied, the ratchet teeth 50 rotate counter-clockwise with respect to the pawls 60, 76, before the ratchet teeth 50 and pawls 60, 76 engage and rotate together, each of the free ends 82, 84 resting against the root 88 of a particular ratchet tooth 50, and thereby transferring load from the drive body 12 to the hub body 14. However, the position of the master pawl 76 in the master depression 74 is modified. Because the spring 72 applies a rotationally clockwise bias to the master pawl 76, the master pawl 76 is the first to contact the root 88 of a particular ratchet tooth 50 after load is applied. Once the master pawl 76 contacts the root 88 of the ratchet tooth 50, the force from the ratchet tooth 50 on the master pawl 76 overcomes the rotational force from the spring 72, sliding the master pawl 76 counter-clockwise in the master depression 74. The master pawl 76 transfers or bears load only when it contacts the rear side 92 of the master depression 74. When this contact occurs, the remaining pawls 60 also make contact with the roots 88 of the respective ratchet teeth 50 as is shown in FIG. 13. When load ceases to be applied, the force of the spring 72 again slides the master pawl 76 rotationally clockwise in the master depression 74, allowing the pawls 60, 76 to function as described in connection with FIG. 14 above.

When the master pawl 76 is used, the force of the wrap spring 72 must vary between the master pawl 76 and the remaining pawls 60. Because all the pawls 60, 76 are biased using the wrap spring 72, if the biasing force on the slave pawls 60 is too great, this force is transmitted through the cam plate 62 to the master pawl 76. If all the pawls 60, 76 are configured identically, this force is sufficient to slide the master pawl 76 counter-clockwise in the master depression 74, thereby forcing the master pawl free end 84 into engagement with a ratchet tooth 50 prematurely and defeating the purpose of using the master pawl 76. As a result, the master pawl 76 must be configured to receive a greater biasing force than the remaining pawls 60. This is preferably accomplished by manipulating the configuration of the pawls 60, 76 to require the wrap spring 72 to contact the pawls 60 in a location different from the master pawl 76, the point of contact between the wrap spring 72 and the master pawl 76 preferably being further away from the axis about which the master pawl 76 generally rotates than the point of contact between the wrap spring 72 and the remaining pawls 60. The use of this type of configuration causes the force of the wrap spring 72 on the master pawl 76 to be greater than that on the remaining pawls 60, thereby reducing the probability of the master pawl 76 sliding prematurely.

A variety of modifications may also be made to this embodiment. First, as already noted, the use of a master pawl 76 and master depression 74 are preferred, but not critical, and all the depressions 56 may be the same size. Second, the engagement of the cam slot 64 and the cam follower 70 may be modified. The cam follower may be a finger attached to or integrally formed with the cam plate 62, in which case the pawls 60, 76 would include cam slots. In addition, the pawls 60, 76 may be positioned on the hub body 14 and the ratchet teeth 50 on the drive body 12. All these modifications and others previously mentioned fall within the scope of the invention.

Figure 15:
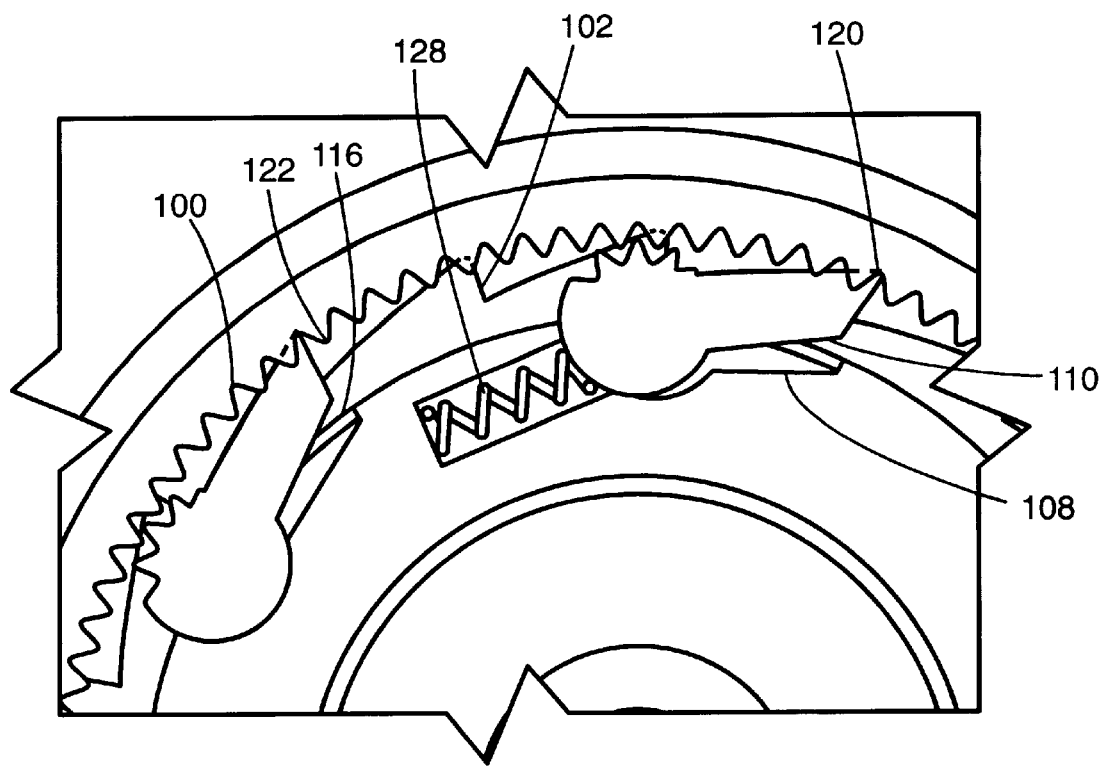
FIG. 15 is a schematic view showing the interaction of the ratchet teeth, pawls, and gear according to a first alternative configuration of a second embodiment of the present invention.
Figure 16:
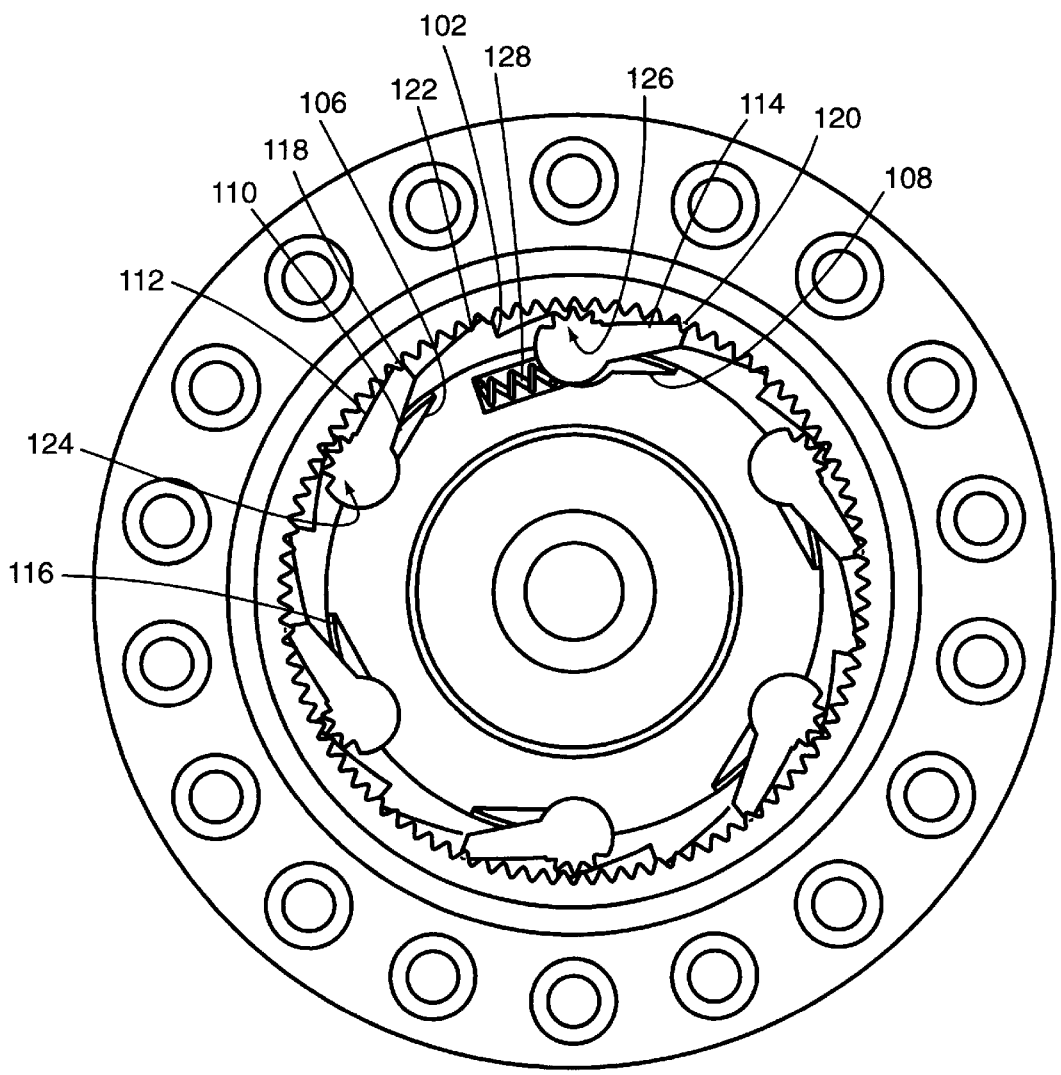
FIG. 16 is a second schematic view showing the interaction of the ratchet teeth, pawls, and gear according to a first alternative configuration of a second embodiment of the present invention.

FIGS. 15 and 16 illustrate a first alternative configuration of a second embodiment of the coasting mechanism 10, where the linkage is a gear. Many of the features of this embodiment are similar to those illustrated and described in connection with the embodiment shown in FIGS. 8–14. The ratchet teeth 102 are again arranged generally circularly around an axis 104 on the hub body 14. The drive body 12 includes a plurality of depressions 106, 108 which are formed to generally conform to the shape of one side 110 of one of the pawls 112, 114. The pawls 112, 114 are shaped in the same way as the pawl shown in FIG. 11, but the pawls 112, 114 of this embodiment do not include a finger, since a cam plate is not used. A wrap spring 116 is again used as a bias to urge the free ends 118, 120 of the pawls 112, 114 outwardly and the pawls 112, 114 are again differently configured to accomplish unequal biasing forces. The operation of the structure of this embodiment is the same as that discussed in connection with the embodiment of FIGS. 8–14, except that a gear 100, rather than a cam plate, acts as the linkage.

The pawls 112, 114 are linked to engage the ratchet teeth 102 substantially simultaneously through a gear 100 which is rotatable about the axis 104. The gear includes teeth 122 which interfit with a gear sector 124, 126 located on each pawl 112, 114. In the preferred embodiment illustrated, the gear 100 is concentrically outward of the pawls 112, 114.

As was shown in the embodiment to FIGS. 8–14, it is desirable to include a master pawl 114 which rests in a master depression 108 which is larger than the remaining depressions 106. However, the requirements of the gear 100 interferes with the ability of the spring 116 to bias the master pawl 114 rotationally clockwise in the master depression 108. Since the use of the gear 100 and gear sector 126 on the master pawl 114 require that the gear teeth 122 and gear sector 126 remain in constant contact to function properly, the acceptable range of radial motion of the master pawl 114 is limited in comparison to the earlier-described embodiment of FIGS. 8–14. It is desirable, therefore, to include a secondary spring 128 to do this biasing. In addition, only when all the pawls 112, 114 are free to rotate to engage the ratchet teeth 102, will the pawls 112, 114 rotate substantially simultaneously because the gear 100 prevents them from rotating independently of each other. In this embodiment, the bias of the secondary spring 128 is again overcome by the force from the ratchet tooth 102 on the free end 120 of the master pawl 114, causing the master pawl 114 to slide rotationally counter-clockwise in the master depression 108 with respect to the axis 104. The bias from the spring 128 again becomes primary when the master pawl 114, and therefore the other pawls 112, become disengaged from the ratchet teeth 102.

It is important that if a master pawl 114 is used that the gear 100 be located concentrically outwardly of the pawls 112, 114 because of the ability of the master pawl 114 to slide in the master depression 108. When the master pawl 114 slides rotationally clockwise in the master depression 108, the gear 100 rotates slightly clockwise. This rotation of the gear 100 rotates the remaining pawls 112 farther clockwise in their respective depressions, which further keeps the free ends 118 from engaging the ratchet teeth 102. If instead the gear 100 is located concentrically inward of the pawls 112, 114 and a master pawl 114 is used, the opposite effect would occur and the free ends 118 would rotate to extend outwardly, which is not desirable. Therefore, it is preferred to use a concentrically outward ring gear 100 with the master pawl 114.

Some modifications are possible for the present embodiment. As mentioned before, the position of the ratchet teeth 102 and pawls 112, 114 can be altered. If the pawls 112, 114 are positioned to be concentrically outward from the ratchet teeth 102, the gear 100 should be positioned concentrically inward of the pawls 112, 114, with the gear teeth 122 facing outward. In addition, a belt system as is commonly substitutable for a gear may be used instead of the gear in this embodiment. All these modifications as well as others previously mentioned fall within the scope of the invention.

Figure 17:
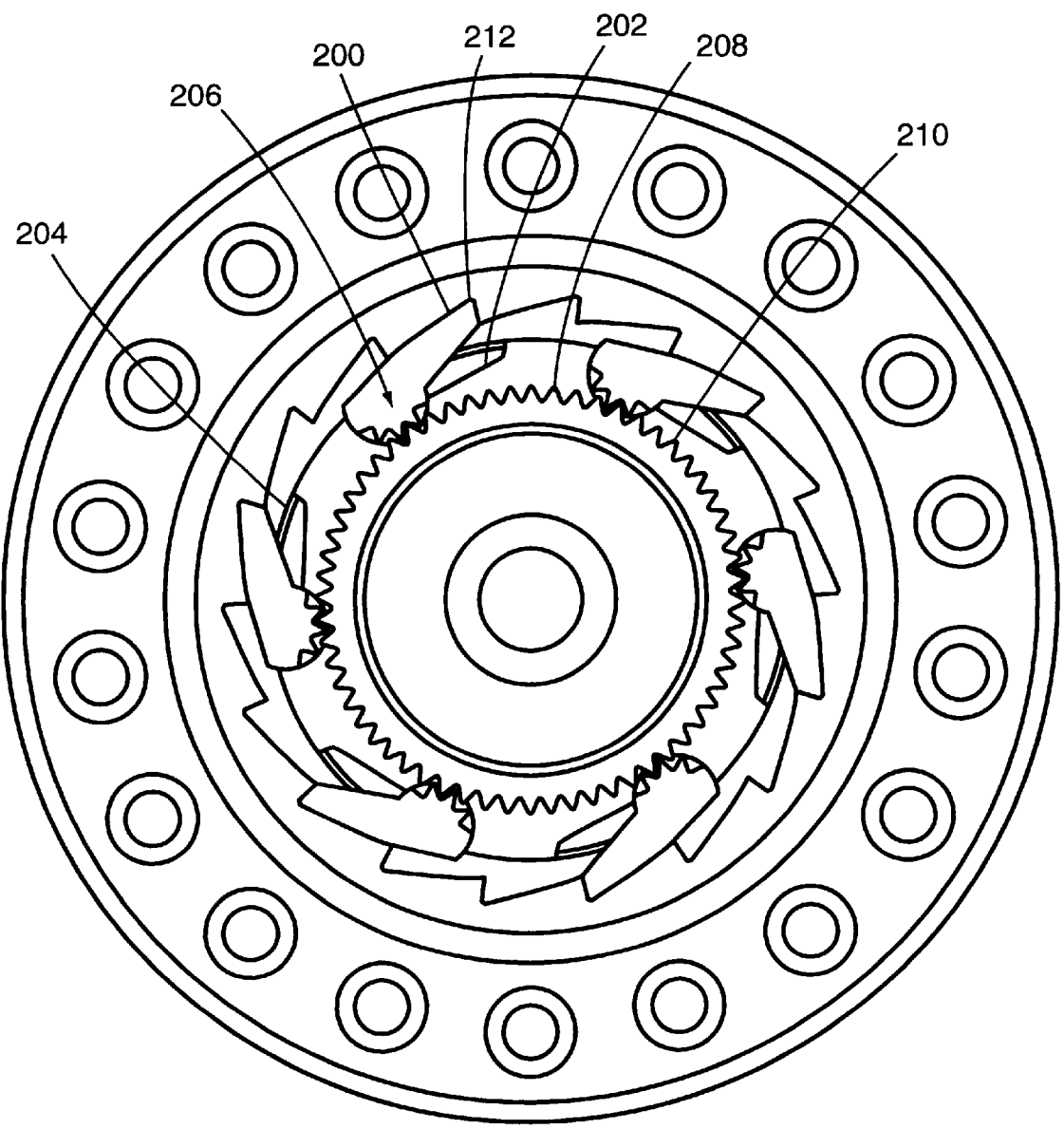
FIG. 17 is a schematic view showing the interaction of the ratchet teeth, pawls, and gear according to a second alternative configuration of a second embodiment of the present invention.

As mentioned above, a different configuration must be used if the gear is to be located concentrically inward of the pawls. This second alternative configuration of the second embodiment where the linkage is a gear is illustrated in FIG. 17. If this configuration is used, all the pawls 200 and depressions 202 are substantially identical. The wrap spring 204 biases each pawl 200 substantially equally. Each pawl 200 includes a gear sector 206 which mates with the teeth 208 on the gear 210. Because the use of a master pawl in this particular configuration causes the free ends 212 of the pawls 200 to rotate outwardly when the master pawl is rotationally clockwise, which is not desirable, no master pawl is used with this configuration. The modifications mentioned above in connection with the previously-described embodiments may also be made to this embodiment.

Figure 18:
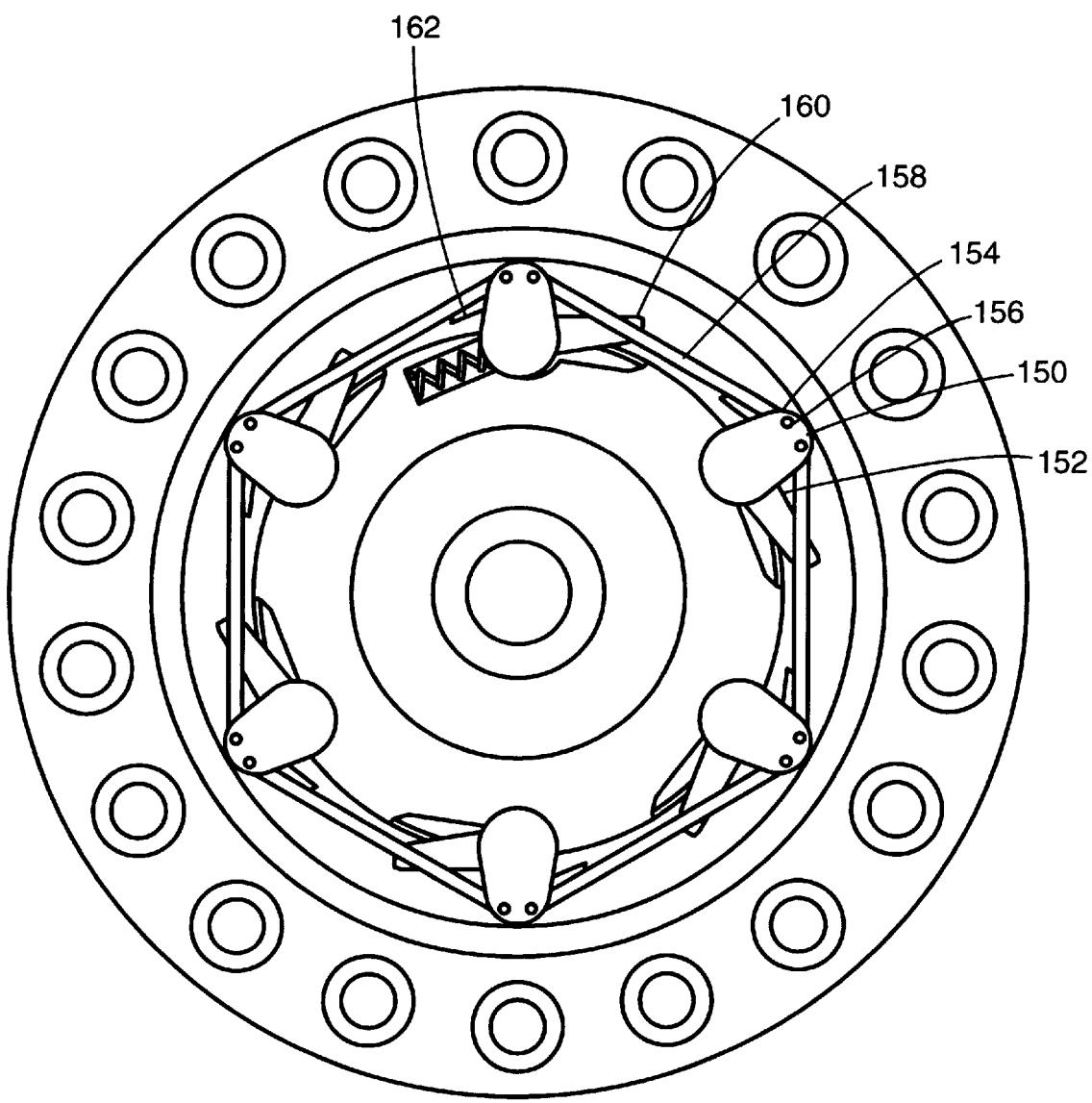
FIG. 18 is a schematic view showing the interaction of the ratchet teeth, pawls, brackets and bands according to a third embodiment of the present invention.

A third embodiment is shown in FIG. 18. In this third embodiment, a bracket and band system is substituted for the gear. This embodiment uses the same master pawl and secondary bias as that shown and described above, and thus these features are not discussed in detail here. In this embodiment, a bracket 150 is secured to each pawl 152. The bracket 150 includes two side plates 154 and a pin 156 linking the two side plates 154. A band 158 is rotatably secured to the brackets 150 of two adjacent pawls 152. The band 158 is preferably relatively inelastic and may be a rod. When all the free ends 160 of the pawls 152 are free to engage the ratchet teeth 162, the pawls will rotate substantially simultaneously due to the action of the bands 158 and brackets 150 causing the pawls 152 to move substantially simultaneously. The cautions with respect to the use of the master pawl and the location of the linkage are the same in this embodiment as were mentioned in connection with the embodiment shown in FIGS. 15 and 16. Other modifications similar to those mentioned in connection with the previously described embodiments may be made to this embodiment as well.

One of ordinary skill in the art is able to make a variety of other modifications to the preferred embodiments disclosed without departing from the spirit of this invention. For example, the linkages specifically disclosed as being preferred embodiments all use a rotational motion to rotate each of the pawls to cause the pawls to engage the ratchet teeth substantially simultaneously. However, other, less preferred configurations could be used. For example, a linkage which has a linear or other non-rotational motion could be used to rotate each pawl. In addition, the pawls could be modified to engage or disengage the pawls through a radially linear or other non-rotational motion. These and other modifications of a similar type fall within the scope of the present invention.

While certain preferred embodiments of the present invention have been disclosed in detail, it is to be understood that various modifications may be adopted without departing from the spirit of the invention or scope of the following claims.

What is claimed is:

1. A bicycle coasting mechanism for permitting the engagement of a drive body configured to engage at least one bicycle sprocket with a hub body configured to engage a bicycle wheel, comprising:

(a) a plurality of pawls interfittingly and movably mounted in a plurality of depressions in one of the bodies and arranged generally circularly about an axis;

(b) a plurality of ratchet teeth mounted on the other of the bodies, the ratchet teeth being configured to engage the pawls and arranged circularly about the axis;

(c) a linkage engaging each pawl; and (d) a secondary pawl which engages the linkage when force is applied to the drive body, thereby moving the linkage.

2. The bicycle coasting mechanism according to claim 1, wherein the linkage is movable, the movement of the linkage moving each pawl, thereby substantially simultaneously engaging the pawls with the ratchet teeth.

3. The bicycle coasting mechanism according to claim 1, wherein the linkage is a cam plate.

4. The bicycle coasting mechanism according to claim 3, wherein the linkage engages each pawl through a plurality of cam slots and a plurality of cam followers, each cam follower slidingly interfitting with one of the cam slots.

5. The bicycle coasting mechanism according to claim 4, wherein the cam slots are made in the cam plate and wherein the cam followers are fingers on the pawls, one finger of one pawl slidingly interfitting with one of the cam slots in the cam plate.

6. The bicycle coasting mechanism according to claim 3, wherein the depressions are generally cylindrical cavities in one of the bodies and each pawl includes a pin which interfits with one of the generally cylindrical cavities.

7. The bicycle coasting mechanism according to claim 6, wherein the linkage engages each pawl through a plurality of cam slots and a plurality of cam followers, each cam follower slidingly interfitting with one of the cam slots.

8. The bicycle coasting mechanism according to claim 6, wherein the cam slots are made in a cam plate and wherein the cam followers are fingers on the pawls, one finger of one pawl slidingly interfitting with one of the cam slots in the cam plate.

9. The bicycle coasting mechanism according to claim 3, wherein each depression is formed to generally conform to the shape of one side of one of the pawls.

10. The bicycle coasting mechanism according to claim 9, wherein the linkage engages each pawl through a plurality of cam slots and a plurality of cam followers, each cam follower slidingly interfitting with one of the cam slots.

11. The bicycle coasting mechanism according to claim 10, wherein the cam slots are made in a cam plate and wherein the cam followers are fingers on the pawls, one finger of one pawl slidingly interfitting with one of the cam slots in the cam plate.

12. The bicycle coasting mechanism according to claim 9, further comprising a spring engaging each of the pawls and applying a bias to urge the rotation of the pawls in the depressions.

13. A bicycle coasting mechanism for permitting the engagement of a drive body configured to engage at least one bicycle sprocket with a hub body configured to engage a bicycle wheel, comprising:
  (a) a plurality of pawls interfittingly and movably mounted in a plurality of depressions in one of the bodies and arranged generally circularly about an axis;
  (b) a plurality of ratchet teeth mounted on the other of the bodies, the ratchet teeth being configured to engage the pawls and arranged circularly about the axis; and
  (c) a gear engaging each pawl.

14. The bicycle coasting mechanism according to claim 13, wherein the gear is concentrically outward of the plurality of pawls.

15. The bicycle coasting mechanism according to claim 13, wherein each pawl has a gear sector configured to interfit with teeth on the gear.

16. The bicycle coasting mechanism according to claim 13, wherein one of the depressions is larger than the remaining depressions, thereby permitting the respective pawl mounted in the larger depression to slide rotationally with respect to the axis.

17. The bicycle coasting mechanism according to claim 16, further comprising a spring biasing the pawl mounted in the larger depression toward one direction in the depression.

18. A bicycle coasting mechanism for permitting the engagement of a drive body configured to engage at least one bicycle sprocket with a hub body configured to engage a bicycle wheel, comprising:
  (a) a plurality of pawls interfittingly and movably mounted in a plurality of depressions in one of the bodies and arranged generally circularly about an axis, one of the depressions being larger than the remaining depressions, thereby permitting the respective pawl mounted in the larger depression to slide rotationally with respect to the axis;
  (b) a plurality of ratchet teeth mounted on the other of the bodies, the ratchet teeth being configured to engage the pawls and arranged circularly about the axis; and
  (c) a linkage engaging each pawl.

19. The bicycle coasting mechanism according to claim 18, wherein the linkage is movable, the movement of the linkage moving each pawl, thereby substantially simultaneously engaging the pawls with the ratchet teeth.

20. The bicycle coasting mechanism according to claim 18, wherein the linkage is a cam plate.

21. The bicycle coasting mechanism according to claim 20, wherein the linkage engages each pawl through a plurality of cam slots and a plurality of cam followers, each cam follower slidingly interfitting with one of the cam slots.

22. The bicycle coasting mechanism according to claim 21, wherein the cam slots are made in the cam plate and wherein the cam followers are fingers on the pawls, one finger of one pawl slidingly interfitting with one of the cam slots in the cam plate.

23. The bicycle coasting mechanism according to claim 20, wherein the depressions are generally cylindrical cavities in one of the bodies and each pawl includes a pin which interfits with one of the generally cylindrical cavities.

24. The bicycle coasting mechanism according to claim 23, wherein the linkage engages each pawl through a plurality of cam slots and a plurality of cam followers, each cam follower slidingly interfitting with one of the cam slots.

25. The bicycle coasting mechanism according to claim 23, wherein the cam slots are made in a cam plate and wherein the cam followers are fingers on the pawls, one finger of one pawl slidingly interfitting with one of the cam slots in the cam plate.

26. The bicycle coasting mechanism according to claim 20, wherein each depression is formed to generally conform to the shape of one side of one of the pawls.

27. The bicycle coasting mechanism according to claim 26, wherein the linkage engages each pawl through a plurality of cam slots and a plurality of cam followers, each cam follower slidingly interfitting with one of the cam slots.

28. The bicycle coasting mechanism according to claim 27, wherein the cam slots are made in a cam plate and wherein the cam followers are fingers on the pawls, one finger of one pawl slidingly interfitting with one of the cam slots in the cam plate.

29. The bicycle coasting mechanism according to claim 26, further comprising a spring engaging each of the pawls and applying a bias to urge the rotation of the pawls in the depressions.

30. A bicycle coasting mechanism for permitting the engagement of a drive body configured to engage at least one bicycle sprocket with a hub body configured to engage a bicycle wheel, comprising:
  (a) a plurality of pawls interfittingly and movably mounted in a plurality of depressions in one of the bodies and arranged generally circularly about an axis;
  (b) a plurality of ratchet teeth mounted on the other of the bodies, the ratchet teeth being configured to engage the pawls and arranged circularly about the axis; and
  (c) a linkage engaging each pawl, the linkage comprising:
    (1) a plurality of brackets, each bracket being attached to one pawl; and
    (2) a plurality of bands secured to adjacent brackets, wherein the motion of one pawl moves the bracket, thereby moving the brackets attached to the remaining pawls through the bands, thereby moving the plurality of pawls substantially simultaneously.

31. A bicycle coasting mechanism for permitting the engagement of a drive body configured to engage at least one bicycle sprocket with a hub body configured to engage a bicycle wheel, comprising:
  (a) a plurality of pawls interfittingly and movably mounted in a plurality of depressions in one of the bodies and arranged generally circularly about an axis;
  (b) a plurality of ratchet teeth mounted on the other of the bodies, each tooth having a root, the ratchet teeth being configured to engage the pawls and arranged circularly about the axis; and
  (c) a timing mechanism engaging each pawl, the timing mechanism preventing any pawls from moving into engagement with the roots of the respective ratchet teeth unless all the pawls can substantially simultaneously engage the ratchet teeth roots.

32. The bicycle coasting mechanism according to claim 30, wherein the linkage is concentrically outward of the pawls.

* * * * *